(12) United States Patent
Radcliffe

(10) Patent No.: US 6,478,303 B1
(45) Date of Patent: Nov. 12, 2002

(54) SEALING RING PACKING

(75) Inventor: Christopher David Radcliffe, Horsforth (GB)

(73) Assignee: Hoerbiger Ventilwerke GmbH, Vienna (AT)

(*) Notice: Subject to any disclaimer, the term of this patent is extended or adjusted under 35 U.S.C. 154(b) by 83 days.

(21) Appl. No.: 09/704,561

(22) Filed: Nov. 3, 2000

(30) Foreign Application Priority Data

Apr. 10, 2000 (AT) .............................. 602/2000

(51) Int. Cl.⁷ .............................................. E21B 33/03

(52) U.S. Cl. ...................... 277/329; 277/336; 277/510; 277/534; 277/541; 277/930; 166/84.1

(58) Field of Search ................ 277/329, 336, 277/500, 510, 534, 541, 597, 930, 931; 166/302, 84.1

(56) References Cited

U.S. PATENT DOCUMENTS

| 2,818,284 A | * | 12/1957 | Stevens ...................... 277/352 |
| 4,191,386 A | * | 3/1980 | Hershey ...................... 277/352 |
| 4,471,963 A | * | 9/1984 | Airhart ........................ 277/301 |
| 5,082,294 A | * | 1/1992 | Toth et al. .................. 277/551 |
| 6,179,594 B1 | * | 1/2001 | Woodcock ................... 277/429 |

* cited by examiner

Primary Examiner—Anthony Knight
Assistant Examiner—Enoch E Peavey
(74) Attorney, Agent, or Firm—Dykema Gossett PLLC

(57) ABSTRACT

A sealing ring packing (1) includes a cooled packing casing (4) that can be placed inside a stuffing box borehole (3), and holds at least one essentially annular slide ring (5) pressed against the moved component (2) to be sealed, whose outside periphery (11) exhibits at least one heat transfer sleeve (9) expandable until resting on the inside periphery of the stuffing box borehole (3) when inserted, and which is otherwise not separately cooled. This makes it possible to avoid the disadvantages of a separate liquid cooling in this area without impermissible temperature rises.

8 Claims, 2 Drawing Sheets

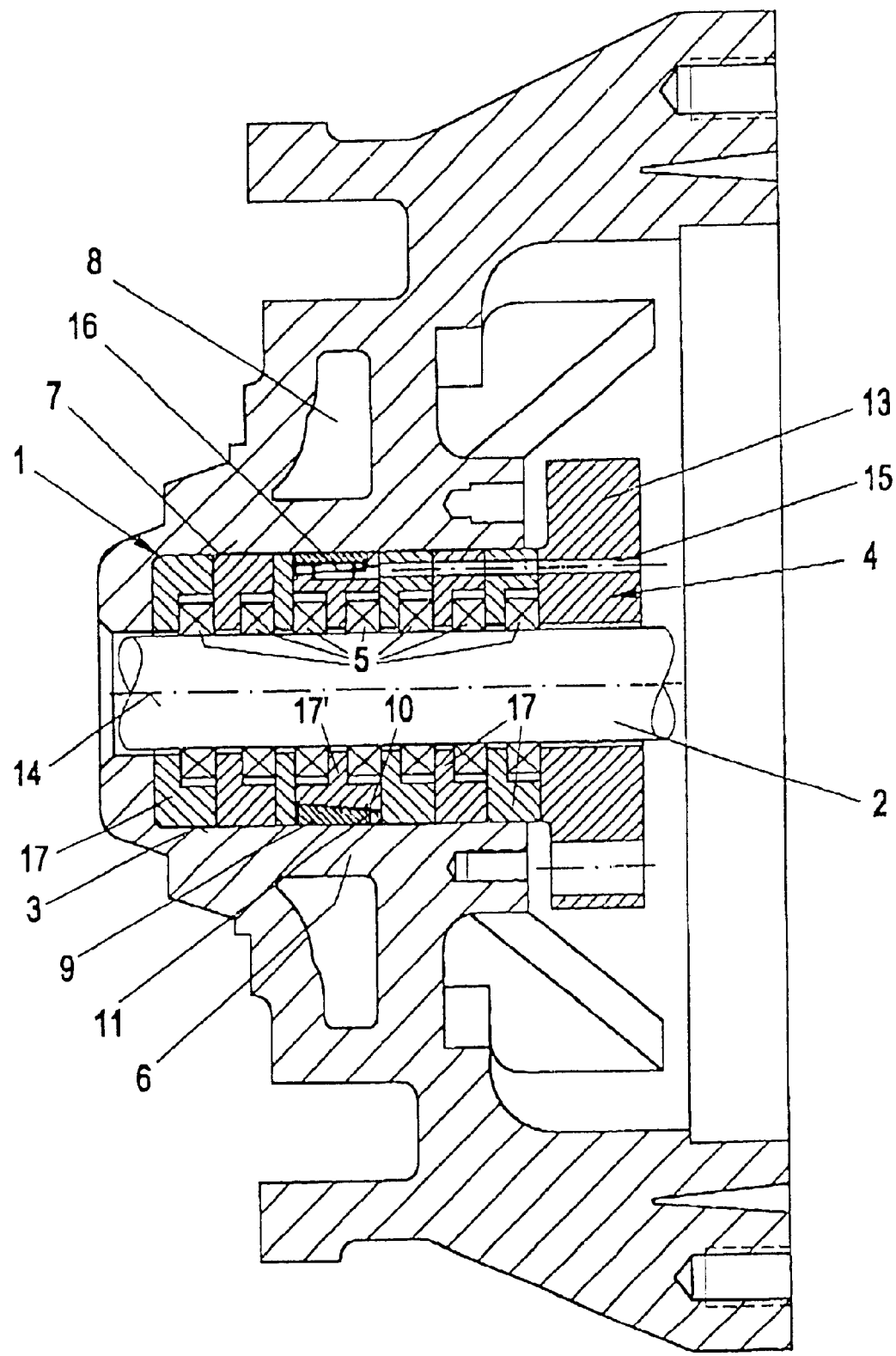

SEALING RING PACKING

BACKGROUND OF THE INVENTION

1. Filed of the Invention

The invention relates to a sealing ring packing, in particular for sealing the passage of the reciprocating piston rod of a reciprocating compressor, including a cooled packing casing that can be placed inside a stuffing box borehole, and holds at least one essentially annular slide ring pressed against the moved component to be sealed.

2. The Prior Art

Most frequently provided by several assembled parts, the packing casings of these packings have up to now always been cooled with water or another suitable, circulating coolant to dissipate the frictional heat that arises during the relative motion between the component to be sealed and the slide ring held in the casing, and thereby avoid impermissible temperature increases, that would result in elevated wear and a correspondingly lower service life of the gaskets, or to a failure on the part of the latter. Along with the additional related costs, however, this can also give rise to problems, for example if coolant gets into the compressor due to worn seals or gaps between the packing casing parts, and hence into the process.

The object of this invention is to avoid the cited disadvantages to these known sealing ring packings, simplify the structure, and in particular to ensure that there is no danger of coolant getting into the process supplied with pneumatic agent by a correspondingly sealed compressor.

SUMMARY OF THE INVENTION

The invention assumes that both can be achieved the easiest when able to perform work without separate active coolant circulation cooling in the area of the sealing ring packing. However, this is only possible if the frictional heat from the packing can be dissipated in another way, since a continuous temperature rise must otherwise take place in this area. The mentioned task is accomplished according to the invention by having the outside periphery of the packing casing include at least one heat transfer sleeve expandable until resting on the inside periphery of the stuffing box borehole when inserted, and otherwise not be separately cooled. As a result, there is a direct thermal contact between at least parts of the outside packing surface and the surrounding stuffing box walls, which are normally cooled with the compressor cylinder or similar components anyway. For structural reasons, however, these walls always exhibit a small air gap about 0.25 $\mu$m thick to the outside walls of the packing casing to enable insertion of the packing into the stuffing box borehole. According to the invention, the outside of the packing casing has a sleeve that can be expanded after insertion into the stuffing box borehole accompanied by a constant thermal contact with the packing casing. This sleeve enables the required good, direct contact to the heat transfer from the packing to the cooled stuffing box walls.

If necessary, of course, correspondingly high heat transfers or heat transfer surfaces in the required area can be achieved by increasing the sleeve length or elevating the number of individual sleeves provided on the packing casing.

In a particularly preferred embodiment of the invention, the heat transfer sleeve is designed as a ring slit on one side with an essentially tapered inside periphery, preferably arranged in a circumferential recess of the packing casing, wherein this sleeve can be shifted axially relative to the packing casing from the outside accompanied by radial expansion, preferably by means of straining screws that engage parallel to the axis and are distributed over the periphery. This makes it very easy to manufacture and assemble the packing, wherein a very simple direct heat transfer can take place between the packing and stuffing box wall via the axial shifting of the heat transfer sleeve following assembly of the packing.

In another configuration of the invention, the heat transfer sleeve in a packing casing made up of several, essentially discoid casing parts, can be arranged on a central casing part preferably having a smaller radius relative to the adjacent casing parts. This makes it very easy to retrofit even sealing ring packings that are already in use by replacing only the central part carrying the heat transfer sleeve. In this way, several of these heat transfer sleeves can be used as needed, as long as it remains possible to expand these sleeves accordingly after insertion of the packing.

In another embodiment of the invention, the packing casing and the heat transfer sleeve are formed of a readily heat-conducting material, preferably copper alloys. This enables an easy and expedient improvement of heat dissipation from the slide ring packings in the packing to the stuffing box wall.

In another preferred configuration of the invention, the heat transfer sleeve is arranged on the outside periphery of the packing casing in such a way that, with the packing inserted, it is adjacent to a separately cooled area of the stuffing box wall. This reduces the path to be traversed by the warmth in the stuffing box wall to be transported away, and hence further improves the overall cooling of the packing.

In the following, the embodiments shown in part diagrammatically in the drawings will be used to explain the invention in greater detail.

BRIEF DESCRIPTION OF THE DRAWINGS

FIG. 2 shows a corresponding view of another embodiment inserted in the stuffing box sleeve of a compressor cylinder (not shown).

DETAILED DESCRIPTION OF THE PREFERRED EMBODIMENTS

Figure 1:
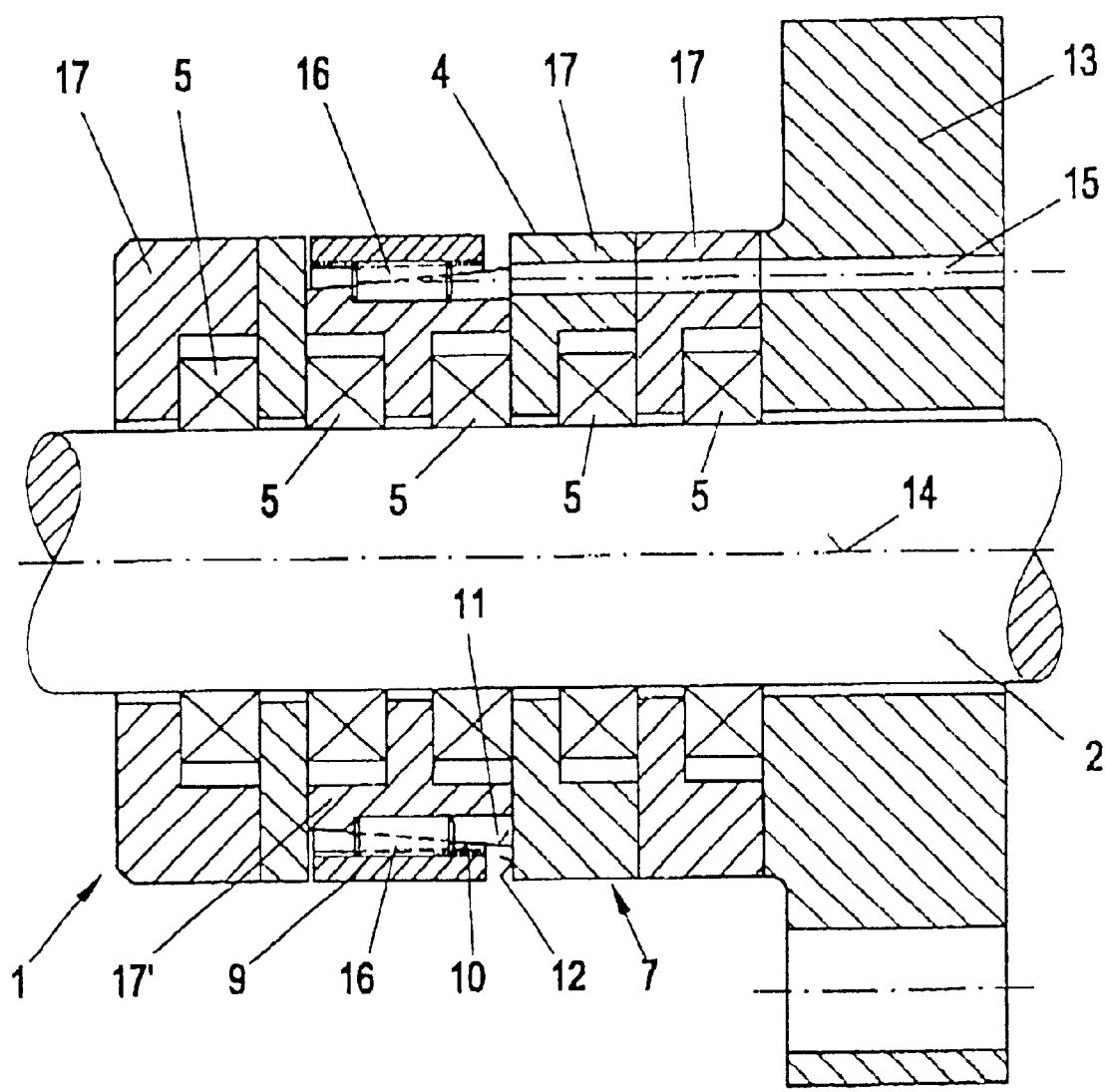
FIG. 1 shows an axial view through a sealing ring packing designed according to the invention.

To the extent possible, FIG. 1 and FIG. 2 will be described simultaneously below. In any event, actually or functionally identical components are marked with the same reference numbers in both figures.

The sealing ring packing 1 depicted in both figures is used to seal the passage of the reciprocating piston rod 2 of a reciprocating compressor (not shown), e.g., of the kind used as a process compressor for varied gases. The packing 1 here exhibits a packing casing 4 that can be inserted into a stuffing box borehole 3 (see FIG. 2), and accommodates several essentially annular slide rings 5 individually pressed against the moved component to be sealed (here piston rod 2). The type and special design of these slide rings 5 is of no greater significance here. The only important factor is that friction relative to the piston rod 2 gives rise to frictional heat, which must be dissipated from the area of the sealing ring packing 1, or device operation would otherwise be accompanied by an impermissible temperature rise along with the problems already touched upon at the outset in this conjunction.

Since the packing casing 4 must exhibit a slight air gap to the stuffing box borehole 3 or corresponding inside periphery of the stuffing box wall 6 for reasons relating to manufacture and assembly, direct heat transfer from the outside periphery 7 of the packing casing 4 to the stuffing box borehole 3 or stuffing box wall 6 and the cooling space 8 surrounding the latter (see FIG. 2) is highly impeded, and at least generally is inadequate to ensure a sufficient heat dissipation from the slide rings 5 with the device in operation. To avoid the necessity of having to provide additional liquid cooling systems in this area with the various disadvantages also described at the outset, the packing casing 4 exhibits a heat transfer sleeve 9 on its outside periphery 7 that can be expanded up to direct contact on the interior periphery of the stuffing box borehole 3 in the inserted state, and is otherwise also not separately cooled. This heat transfer sleeve 9 is designed as a ring slit on one side with an essentially tapered inside periphery 10, and arranged on a correspondingly inclined outside periphery area 11, here in a circumferential recess 12 of the packing casing 4. The heat transfer sleeve 9 can be shifted axially relative to the packing casing 4 from the outside (from the right starting at flange 13 in both figures) accompanied by radial expansion by means of screws 16 that engage parallel to the axis 14 and can be actuated via the borehole or boreholes 15. This eliminates the mentioned (but not shown in FIG. 2) gap between the packing casing 4 and stuffing box borehole 3, and sets up a direct heat transfer from the outside periphery area 11 to the cooled stuffing box wall 6.

The packing casing 4 consists of several, essentially discoid casing parts 17, wherein only a central casing part 17' is designed with a radius smaller than that of the adjacent casing parts (designed here as a so-called T-cup) to accommodate a heat transfer sleeve 9. This central area 17' can also be made wider, or several components accommodating heat transfer sleeves 9 can be provided, so that heat transfer can be adjusted as needed.

I claim:

1. Sealing ring packing for sealing passage of a reciprocating piston rod of a reciprocating compressor, including a cooled packing casing that can be placed inside a stuffing box borehole and holds at least one essentially annular slide ring pressed against the reciprocating piston rod to be sealed, wherein an outside periphery of the packing casing includes at least one heat transfer sleeve which is radially expandable in order to contact an inside periphery of the stuffing box borehole when inserted to transfer heat to the stuffing box, and is otherwise not separately cooled.

2. Sealing ring packing according to claim 1, wherein the heat transfer sleeve is designed as a ring-slit on one side with an essentially tapered inside periphery, and is arranged on a correspondingly inclined outside periphery area, and said sleeve can be shifted axially relative to the packing casing from the outside accompanied by radial expansion.

3. Sealing ring packing according to claim 2, wherein the heat transfer sleeve is arranged in a circumferential recess of the packing casing.

4. Sealing ring packing according to claim 2, wherein said sleeve is shifted axially relative to the packing casing by straining screws that engage parallel to an axis of the packing and are distributed over the periphery.

5. Sealing ring packing according to claim 2, wherein the packing casing comprises several, essentially discoid casing parts, including a central casing part having a smaller radius relative to adjacent casing parts, and wherein the heat transfer sleeve is located on the central casing part.

6. Sealing ring packing according to claim 1, wherein the packing casing and heat transfer sleeve consist of readily heat-conducting material.

7. Sealing ring packing according to claim 6, wherein said heat-conducting material is a copper alloy.

8. Sealing ring packing according to claim 1, wherein the heat transfer sleeve is located on the outside periphery of the packing casing so as to be adjacent to a separately cooled area of the stuffing box wall with the packing inserted.

* * * * *